(12) United States Patent
Schmudde et al.

(10) Patent No.: US 12,370,582 B2
(45) Date of Patent: Jul. 29, 2025

(54) HOUSING CLEANING DEVICE FOR CLEANING A HOUSING OF A SCREW MACHINE

(71) Applicant: Coperion GmbH, Stuttgart (DE)

(72) Inventors: Markus Schmudde, Steinheim a.d. Murr (DE); Mareike Tabeling, Stuttgart (DE); Franziska Hagel, Stuttgart (DE); Andreas Büchler, Fellbach (DE); Patricio Nuzzi, Ditzingen (DE)

(73) Assignee: COPERION GMBH, Stuttgart (DE)

( * ) Notice: Subject to any disclaimer, the term of this patent is extended or adjusted under 35 U.S.C. 154(b) by 812 days.

(21) Appl. No.: 17/433,683

(22) PCT Filed: Mar. 5, 2020

(86) PCT No.: PCT/EP2020/055784
§ 371 (c)(1),
(2) Date: Aug. 25, 2021

(87) PCT Pub. No.: WO2020/187579
PCT Pub. Date: Sep. 24, 2020

(65) Prior Publication Data
US 2022/0105547 A1   Apr. 7, 2022

(30) Foreign Application Priority Data
Mar. 19, 2019  (DE) ...................... 10 2019 203 661.9

(51) Int. Cl.
*B08B 9/045*   (2006.01)
*B08B 9/043*   (2006.01)

(52) U.S. Cl.
CPC ............ *B08B 9/045* (2013.01); *B08B 9/0433* (2013.01); *B08B 9/0436* (2013.01); *B08B 2209/04* (2013.01)

(58) Field of Classification Search
CPC ..... B08B 9/0433; B08B 9/0436; B08B 9/045; B08B 2209/04; B29C 48/27; B29C 48/271
See application file for complete search history.

(56) References Cited

U.S. PATENT DOCUMENTS 3,987,963 A   10/1976   Pacht
5,156,861 A   10/1992   Tsuchiya et al.
(Continued)

FOREIGN PATENT DOCUMENTS

CN   1914352 A   2/2007
CN   107617522 A   1/2018
(Continued)

OTHER PUBLICATIONS

PCT/EP2020/055784 International Search Report mailed Aug. 10, 2020.
(Continued)

*Primary Examiner* — C. A. Rivera
(74) *Attorney, Agent, or Firm* — DINSMORE & SHOHL LLP

(57) ABSTRACT

A housing cleaning device for cleaning a housing of a screw machine comprises a support unit displaceable relative to the housing, and at least one housing cleaning unit arranged at the support unit, for cleaning an inner wall of the housing, wherein the at least one housing cleaning unit can be reversibly inserted into the housing. An associated shaft cleaning device for cleaning at least one treatment element shaft of the screw machine comprises a cleaning chamber, in which the at least one treatment element shaft can be arranged, and at least one shaft cleaning unit arranged in the cleaning chamber.

18 Claims, 5 Drawing Sheets

(56) References Cited

U.S. PATENT DOCUMENTS

| | | | |
|---|---|---|---|
| 5,706,842 A | 1/1998 | Caimi et al. | |
| 2016/0221050 A1 | 8/2016 | Beck et al. | |

FOREIGN PATENT DOCUMENTS

| | | | | |
|---|---|---|---|---|
| CN | 206854292 U | 1/2018 | | |
| DE | 10055140 C1 | * 5/2002 | ............ | B08B 9/021 |
| DE | 202018105882 U1 | 1/2019 | | |
| EP | 3446797 A1 | 2/2019 | | |
| JP | H07195482 A | 8/1995 | | |
| JP | 2002144374 A | 5/2002 | | |
| KR | 101925712 B1 | 12/2018 | | |
| WO | 200114073 A1 | 3/2001 | | |

OTHER PUBLICATIONS

Chinese Office Action for Patent Application No. 2020 8002 2603.5 dated Apr. 7, 2023, 25 pages.
Extended European Search Report for Application No. 22 170 619.5 dated Aug. 18, 2022, 10 pages.
The Second Office Action dated Dec. 26, 2023 related to Chinese Application No. 202080022603.5.

* cited by examiner

HOUSING CLEANING DEVICE FOR CLEANING A HOUSING OF A SCREW MACHINE

CROSS REFERENCES TO RELATED APPLICATIONS

This application is a 35 USC 371 US National Stage Application of PCT/EP2020/055784 filed Mar. 5, 2020, which claims the priority benefit of German Patent Application DE 10 2019 203 661.9 filed Mar. 19, 2019, the disclosures of which are hereby incorporated by reference herein as if fully set forth in their entirety.

FIELD OF THE INVENTION

The invention relates to a housing cleaning device for cleaning a housing of a screw machine. The invention further relates to a shaft cleaning device for cleaning at least one treatment element shaft of the screw machine, and to a cleaning system comprising such a housing cleaning device and/or such a shaft cleaning device. The invention is further directed to a method for cleaning a screw machine.

BACKGROUND OF THE INVENTION

From DE 44 17 357 A1 a method and a device for cleaning a screw machine are known. Cleaning is carried out by passing cleaning fluid through the screw machine, wherein in particular connections for supplying the cleaning fluid are provided in a housing of the screw machine. Such a device requires complex design work on the screw machine, is maintenance-intensive and does not always guarantee the required cleaning quality.

SUMMARY OF THE INVENTION

The invention is based on an object of providing an improved housing cleaning device for cleaning a housing of a screw machine, which is particularly easy to maintain and ensures a high cleaning quality.

This object is achieved by a housing cleaning device for cleaning a housing of a screw machine, having a support unit displaceable relative to the housing, and at least one housing cleaning unit attached to the support unit for cleaning an inner wall of the housing, wherein the at least one housing cleaning unit is reversibly insertable into the housing. According to the invention, it has been recognized that the housing cleaning device with the support unit and the housing cleaning unit arranged thereon must be designed such that the at least one housing cleaning unit can be inserted reversibly into the housing of the screw machine in order to ensure a high cleaning quality in the region of the housing of the screw machine incurring low maintenance effort, in particular without constructive modification measures. For cleaning the housing, the at least one treatment element shaft of the screw machine is removed from the housing. The screw machine may be designed as a single-shaft screw machine. Preferably, the screw machine is a multi-shaft screw machine, in particular a twin-shaft screw machine. Preferably, all of the treatment element shafts are removed from the housing for cleaning the housing. Insertability into the housing is understood to mean insertability into an interior space of the housing, in particular into a treatment space of the housing. Preferably, the support unit and/or the at least one housing cleaning unit are insertable into the housing along at least 25%, in particular at least 50%, in particular 75%, of a longitudinal extension of the interior space, in particular of the treatment space. For this purpose, a dimension of the support unit and/or of the at least one housing cleaning unit, in particular in radial direction to a longitudinal axis of the support unit, is smaller than a dimension of the interior space. A longitudinal extension of the support unit, is preferably at least 25%, in particular at least 50%, in particular at least 75%, in particular at least 100% of a length of the interior space. Advantageously, this ensures that the inner wall of the housing can be reliably cleaned over its entire length.

According to one aspect of the invention, the housing cleaning unit is displaceable relative to the housing along and/or transversely to a longitudinal direction of the housing, particularly when cleaning the housing. Cleaning of the housing can thus be performed in a particularly flexible and safe manner.

The support unit can be designed rigidly, in particular as a rigid rod, or flexibly, in particular as a chain and/or a rope. The support unit can be designed as a telescopic rod for easy insertion into the housing and/or for displacement in the housing. Cleaning of the housing can thus be carried out even when only little installation space is available.

According to one aspect of the invention, the housing cleaning device is designed to introduce at least one cleaning medium into the housing. The at least one cleaning medium may comprise liquid components, in particular water and/or solvents and/or acidic cleaning media and/or alkaline cleaning media, and/or solid components, in particular cleaning granules, in particular cleaning sand and/or ceramic granules and/or dry ice, and/or suspensions of the solid and liquid components, and/or compressed air, in particular hot air, and/or steam. In particular, the housing cleaning device can be designed to introduce different cleaning media into the housing simultaneously or one after the other in time. The housing cleaning device can be designed for wet cleaning with liquid cleaning media. The housing cleaning device can be designed to introduce the cleaning medium into the housing at an adjustable temperature and/or pressure. The housing cleaning device can also be designed for, in particular, exclusively dry cleaning, in particular with compressed air. Preferably, the housing cleaning device is designed for cleaning the housing in a plurality of timely consecutive steps. Preferably, the dry cleaning is performed in the last of the consecutive cleaning steps in order to avoid corrosion of the housing. In particular, the last cleaning step may comprise the application of an anti-corrosion agent. In particular, drying the housing with the compressed air ensures that corrosion is reliably avoided.

Preferably, the housing cleaning device comprises at least one inflow valve and/or at least one outflow valve for controlling an inflow and/or an outflow of the cleaning medium. The cleaning process can thus be controlled in a particularly flexible manner.

The housing comprises a feed opening for feeding the medium to be conveyed. Further, the housing comprises a discharge opening for discharging the medium to be conveyed. According to one aspect of the invention, the housing cleaning device comprises a closing unit for closing the discharge opening. Preferably, the closing unit can be attached to the housing in a sealing manner. The closing unit may have a discharge line for conducting the at least one cleaning medium out of the housing. Further, the closing unit may have a support unit feedthrough for passing the support unit therethrough. In the region of the support unit feedthrough, the support unit may penetrate the closing unit. Preferably, the closing unit has a feedthrough seal for sealing with respect to the support unit. The closing unit may have a feedthrough bearing for axially and/or rotationally mounting the support unit. By arranging the closing unit on the housing, the latter can be sealed to the greatest possible extent during the cleaning procedure. The support unit and/or the at least one housing cleaning unit can be displaced freely to the greatest possible extent, at a defined distance from the housing, due to the support unit feedthrough.

According to one aspect of the invention, the housing cleaning device has a housing drive means. The housing drive means may be attached to the support unit, in particular in a reversible manner. The housing drive means is preferably configured as to rotationally and/or translationally displace the support unit and/or the at least one housing cleaning unit relative to the housing, in particular along the longitudinal extension of the housing. The housing drive means may be integrated into the closing unit, in particular into the feedthrough bearing. The housing drive means enables an automation of the cleaning of the housing.

According to one aspect of the invention, the at least one housing cleaning unit is designed for cleaning a gear lantern of the screw machine. Preferably, the at least one housing cleaning unit is fixedly arranged in the gear lantern or can be reversibly inserted into the gear lantern. Advantageously, this ensures that the gear lantern can also be reliably freed from contaminants.

The screw machine preferably has a feed hopper for feeding, in particular for metering, a medium to be conveyed by means of the screw machine. The medium can be, for example, a plastic medium, in particular in the form of granules. The housing cleaning device can have a hopper feeding device for feeding the cleaning medium via the feed hopper. The hopper feeding device can be supplied with the cleaning medium together with the at least one housing cleaning unit via a common supply device. In particular, the hopper feeding device and the at least one cleaning unit are in fluid-conducting connection with the same supply device. A feed hopper of the screw machine can thus be cleaned particularly reliably and efficiently.

A housing cleaning device in which the at least one housing cleaning unit has at least one housing cleaning nozzle for discharging at least one cleaning medium ensures a particularly reliable cleaning of the housing. Preferably, more than one cleaning medium can be discharged via the at least one housing cleaning nozzle. Preferably, the at least one housing cleaning unit comprises at least two housing cleaning nozzles which have different nozzle shapes. The nozzle shape of the at least one housing cleaning nozzle can be round, in particular circular or slot-shaped.

The support unit may have an integrated line for conducting the at least one cleaning medium. For this purpose, the support unit can be designed as a hollow rod and/or as a tube. The at least one housing cleaning nozzle may be in fluid-conducting connection with the support unit. The housing cleaning device is thus particularly easy to handle.

A housing cleaning device in which the at least one housing cleaning nozzle is rotatably mounted relative to the support unit ensures particularly intensive cleaning of the housing. The at least one housing cleaning nozzle is attached to the support unit preferably to be driven in rotation. The at least one housing cleaning nozzle may be motor-driven. Alternatively, the at least one housing cleaning nozzle may be rotationally drivable by the flow of the cleaning medium, in particular by the discharge of the cleaning medium. For this purpose, the at least one housing cleaning nozzle can be designed such that, when the cleaning medium is discharged, a torque is provided about a housing nozzle axis, about which the at least one housing cleaning nozzle is rotatably mounted.

A housing cleaning device in which the at least one housing cleaning unit has at least one housing contact cleaning element, connected with the support unit, for contact cleaning of the housing ensures an improved cleaning of the housing. The housing contact cleaning element can be designed as a cleaning brush and/or as a cleaning sponge and/or as a cleaning chain for knocking off stubborn soiling and/or as a cleaning sieve for sieving out contaminants from the cleaning medium and/or as a cleaning cloth and/or as a pull-off lip, in particular for pulling moist surfaces dry. The housing contact cleaning element designed as a cleaning brush can be designed as a solid brush and/or as a spiral-shaped helical brush, in particular with a continuous brush comb and/or with brush bundles spaced apart from one another. Preferably, the housing contact cleaning element designed as a cleaning brush is configured to be similar to the screw elements of the treatment element shaft. Preferably, the cleaning brushes of mutually spaced support units are designed such that they contact each other in a wiping manner during the cleaning procedure of the housing, in particular engage with one another. Preferably, the housing contact cleaning element is designed such that the cleaning brushes can be combined with one another, depending on the degree of contamination of the housing, in particular can be connected with the support unit in a modular and/or reversible manner. For example, a comparatively soft cleaning brush can be used for a conveying zone of the housing, whereas a harder cleaning brush can be used for a melting zone of the housing. For simultaneous cleaning of both the conveying zone and the melting zone, the softer and the harder brush can be attached to the support unit at a distance from each other. The at least one housing contact cleaning element may have a plastic material and/or a metal, in particular a non-ferrous metal, in particular brass and/or copper.

According to one aspect of the invention, the at least one housing contact cleaning element is—displaceable, in particular rotatable, relative to the at least one support unit. For example, the at least one housing contact cleaning element may be configured as a rotatable cleaning roller.

In accordance with another aspect of the invention, the housing cleaning device has at least two housing contact cleaning elements. These may be rotatably mounted about axes that are spaced apart from one another in the transverse direction. Preferably, the at least two housing contact cleaning elements are designed as to mesh tightly with one another and/or as to penetrate one another. Advantageously, this ensures that the at least two housing contact cleaning elements clean each other.

According to one aspect of the invention, the housing cleaning device has at least one housing cleaning unit configured as a housing cleaning nozzle and at least one housing cleaning unit configured as a housing contact cleaning element. Preferably, the at least one housing cleaning nozzle is disposed along the longitudinal axis at the same height as the at least one housing contact cleaning element.

A housing cleaning device in which the support unit has a coupling portion for the connection with a shaft drive of the screw machine can be manufactured in a particularly inexpensive manner. The coupling portion preferably is designed for the torque-transmitting connection to a lantern coupling in the transmission lantern. The coupling portion may be formed as a splined shaft connection. The housing drive means may be entirely formed by the shaft drive of the screw machine. Additional components for displacing the support unit and/or the at least one housing cleaning unit relative to the housing may be saved.

According to one aspect of the invention, the coupling portion and/or the lantern coupling are configured as to provide automatic detection of the support unit connected thereto and/or the specific design of the housing cleaning device. This enables the screw machine, in particular a control device of the screw machine, to automatically detect the connection of the housing cleaning device. A cleaning program can be automatically selected according to the specific design of the housing cleaning device. Operating parameters of the screw machine may be preset correspondingly, in particular limited for safety reasons.

A housing cleaning device in which the support unit is designed as to be rotatably mounted relative to the housing ensures particularly reliable and intensive cleaning of the housing. For driving the support unit in rotation, the latter can be connected to the shaft drive and/or the housing drive means in a torque-transmitting manner, as described above. Alternatively, the torque required for rotation can be provided by discharging the cleaning medium via the at least one housing cleaning nozzle.

A housing cleaning device comprising at least one support coupling for reversibly connecting the at least one housing cleaning unit with the support unit can be applied in a particularly flexible manner and can be maintained easily. Due to the fact that the at least one housing cleaning unit can be reversibly attached to the support unit by means of the at least one support coupling, the at least one housing cleaning unit can be adapted according to the requirements of the respective cleaning process. For example, the at least one housing cleaning unit can be selected such that its dimensions safely ensure easy insertion into the housing and reliable cleaning of the housing. In particular, the at least one housing contact cleaning element connected to the support unit may be configured as to reliably engage with the housing. Preferably, the at least one support coupling can be released without tools. Preferably, the at least one support coupling comprises a mechanical connection and/or at least one fluid-conducting connection for conducting the at least one cleaning medium.

A housing cleaning device comprising a guide unit for axially guiding the support unit on the housing can be displaced particularly easily and safely in the housing. By forming the housing cleaning device with the guide unit, the housing cleaning device can be reliably prevented from hitting the housing. The guide unit may be of contacting or non-contacting design. According to one aspect of the invention, the guide unit may be formed by the housing contact cleaning element, in particular as a cleaning brush. The housing contact cleaning element, in particular the cleaning brush, may be configured for, in particular concentrically, guiding the housing cleaning device in the housing. The contacting guide unit can have a guide body for mechanically guiding the housing cleaning device, in particular the support unit, in the housing. The guide body preferably has a central recess through which the support unit passes. The guide body can be configured in a disc-shaped and/or star-shaped manner. Preferably, the guide body has drainage recesses through which the at least one cleaning medium can flow off along the longitudinal axis.

The guide unit, which is designed to be contact-free, ensures that the support unit is guided by discharging the at least one cleaning medium. For this purpose, the guide unit may have guide nozzles for discharging the cleaning medium. The guide nozzles can be designed as housing cleaning nozzles. Due to the contact-free guidance of the support unit in the housing, the mechanical stress on the inner wall is reduced. Damage to the housing can be reliably prevented.

A housing cleaning device in which the support unit is designed as to be modular, and for this purpose has at least two support modules which are reversibly connectable with one another along a longitudinal axis of the support unit can be operated particularly flexibly and cost-efficiently. The reversibly interconnectable support modules can have different dimensions. In particular, the support modules can have different housing cleaning units. The possibility of replacing individual support modules enables the housing cleaning device to be adapted to the respective cleaning requirements, as well as the replacement of individual support modules due to wear.

In accordance with one aspect of the invention, the support unit may have at least one branch support module branching from a main support module.

A housing cleaning device in which the support unit has an adjustment element which is designed such that the at least one housing cleaning unit is arrangeable at the support unit, at an adjustable distance transversely to a longitudinal axis of the support unit is particularly flexible in use. The housing cleaning device with the housing cleaning unit arranged at a distance transversely to the longitudinal axis, wherein the distance between the longitudinal axis and the housing cleaning unit is adjustable, can be flexibly applied for housings with different inner diameters. Preferably, at least two housing cleaning units, in particular diametrically opposing one another, can be arranged on the support unit at an adjustable distance transversely to the longitudinal axis. Advantageously, this allows several housing bores of a screw machine to be cleaned simultaneously. The at least two housing cleaning units can preferably be arranged at the support unit such that a distance be-tween them corresponds to a distance between the central longitudinal axes of the housing bores. The housing cleaning device is thus designed for efficient cleaning of multi-shaft screw machines.

According to one aspect of the invention, the housing cleaning device is configured for non-rotationally symmetrical cleaning of the housing. This enables cleaning, in particular of a plurality of housing bores, of a multi-shaft screw machine in an efficient manner.

A housing cleaning device in which the at least one housing cleaning unit is designed as to convey contaminants along a longitudinal axis of the support unit ensures the reliable transport of the at least one cleaning medium in the housing. For conveying the contaminants along the longitudinal axis, the at least one housing cleaning nozzle can have a spray direction oriented at least partially in the direction of the longitudinal axis, in particular in the direction of an outflow, in particular of the discharge opening. The at least one housing cleaning nozzle can also be oriented opposite to a conveying direction of the screw machine. Due to this, contaminants can be efficiently soaked. At least one housing cleaning nozzle is preferably oriented transversely to a longitudinal extension of the support unit, in order to reliably loosen contaminants from the housing. According to one further aspect of the invention, the at least one housing contact cleaning element, in particular the cleaning brush and/or the pull-off lip, is configured in a spiral-shaped manner, in particular with a conveying pitch. The spiral-shaped housing contact cleaning element preferably has at least one, in particular at least two, in particular at least three, threads. When the at least one housing contact cleaning element is rotated, the cleaning medium can thereby be conveyed, in particular in the direction of an outflow, in particular of the discharge opening.

Preferably, the at least one housing cleaning unit, in particular the housing contact cleaning element and/or the housing cleaning nozzle, is designed for displacement, in particular linear displacement and/or rotation, of the housing cleaning device relative to the housing of the screw machine. For example, the housing cleaning nozzle may be oriented such that the fluid mass flow applied through said housing cleaning nozzle causes an impulse to displace the housing cleaning device relative to the housing. The housing contact cleaning element may be configured such that the displacement of the housing cleaning device by means of the housing drive means causes a displacement of the housing cleaning device relative to the housing, due to the contact of the housing contact cleaning element with the housing. For example, for this purpose, the housing cleaning unit may comprise obliquely oriented cleaning brushes and/or housing cleaning nozzles oriented in the displacement direction.

A housing cleaning device comprising a housing control device for automated controlling of a displacement of the support unit relative to the housing and/or of a mass flow of at least one cleaning medium introduced into the housing can be operated particularly economically. The housing control device may be in signal communication with the at least one inflow valve and the at least one outflow valve, for controlling the mass flow of the cleaning medium discharged via the at least one housing cleaning nozzle. Further, the housing control device may be in signal communication with the housing drive means, for automated displacement of the support unit relative to the housing. The housing control device may also be in signal communication with a drive of the at least one housing contact cleaning element and/or a pump for conveying the cleaning medium. The cleaning of the housing can thus be carried out in a particularly cost-and time-efficient manner.

The invention is further based on an object of creating a shaft cleaning device for cleaning at least one treatment element shaft of a screw machine, which can be used for existing screw machines and ensures the cleaning of the treatment element shaft in a particularly reliable manner and is easy to maintain.

This object is achieved by a shaft cleaning device for cleaning at least one treatment element shaft of a screw machine, having a cleaning chamber in which the at least one treatment element shaft is arrangeable, and at least one shaft cleaning unit arranged in the cleaning chamber. The advantages of the shaft cleaning device according to the invention correspond to the advantages of the housing cleaning device described. In particular, the at least one shaft cleaning unit can be further developed with the features of the at least one housing cleaning unit.

Preferably, the cleaning chamber has at least one, in particular at least two, in particular at least three, in particular at least four cleaning portions. Preferably, the cleaning portions are separated from each other in a fluid-tight or liquid-tight manner by chamber seals. The chamber seals can be designed as sealing curtains.

According to one further aspect of the invention, the shaft cleaning device may be configured to receive the at least one treatment element shaft without displacement relative to the cleaning chamber. Preferably, the at least one shaft cleaning unit is configured such that it is displaceable relative to the at least one treatment element shaft and/or to the cleaning chamber. For example, the at least one shaft cleaning unit can be designed as to be displaceable along the chamber longitudinal axis and/or about the chamber longitudinal axis, in particular about the treatment element shaft, in particular in a circular and/or spiral manner. The cleaning of the treatment element shaft can thus be carried out particularly intensively and reliably.

According to one aspect of the invention, the cleaning chamber has at least one viewing window. By means of the viewing window, the cleaning state of the treatment element shaft can be monitored. The cleaning chamber may have a, in particular sealed, hand access for manual cleaning by a user. For this purpose, the shaft cleaning device may have a shaft cleaning unit that can be manually displaced relative to the at least one treatment element shaft.

A shaft cleaning device in which the at least one shaft cleaning unit has at least one shaft cleaning nozzle for discharging at least one cleaning medium ensures a particularly thorough cleaning of the at least one treatment element shaft. Preferably, the at least one shaft cleaning nozzle can be further developed with the features of the at least one housing cleaning nozzle.

A shaft cleaning device comprising shaft drive means for displacing the treatment element shaft relative to the at least one shaft cleaning unit can be operated particularly economically. The shaft drive device can be designed for translational and/or rotational displacement of the at least one treatment element shaft relative to the cleaning chamber. For example, the treatment element shaft can be displaceable by means of the shaft drive device in a purely rotational manner, in particular about a chamber longitudinal axis of the cleaning chamber. Alternatively, the at least one treatment element shaft can be translationally displaced relative to the cleaning chamber by means of the shaft drive device. In particular, the shaft drive device can be configured as to move the treatment element shaft through the cleaning chamber, in particular the plurality of cleaning portions, during the cleaning procedure. Due to the fact that the shaft cleaning device is formed with a shaft drive device, the cleaning of the at least one treatment element shaft can be automated.

A shaft cleaning device comprising at least one wet cleaning portion and/or at least one dry cleaning portion ensures a particularly thorough cleaning of the at least one treatment element shaft. Stress on the treatment element shaft due to moisture-related corrosion is reliably prevented. In the at least one wet cleaning portion, liquid cleaning medium is applied to the treatment element shaft. In the at least one dry cleaning portion, the treatment element shaft is cleaned without the use of liquid cleaning media. In particular, the at least one dry cleaning portion is configured as to dry the treatment element shaft. For this purpose, the shaft cleaning device may have at least one drying blower in the region of the dry cleaning portion.

The at least one shaft cleaning unit may have at least one shaft contact cleaning element. The at least one shaft contact cleaning element may be further developed by the features of the at least one housing contact cleaning element. Preferably, the at least one shaft contact cleaning element can be driven in rotation. In particular, the at least one shaft contact cleaning element may be configured as a cleaning brush, in particular one that tightly meshes with the at least one treatment element shaft. According to one aspect of the invention, the at least one shaft cleaning unit has the at least one shaft contact cleaning unit in the form of a cleaning brush, in the dry cleaning portion.

According to one further aspect of the invention, the shaft cleaning device is configured as to discharge exclusively clear water in at least one of the cleaning portions. The shaft cleaning device may further be configured as to discharge cleaning medium containing alkali and/or acid and/or cleaning granules in at least one of the cleaning portions. Preferably, the wet cleaning portion comprises, in particular sequentially, a soaking portion and/or a cleaning portion and/or a clear rinsing portion. The shaft cleaning device can also be designed for complete dry cleaning. For this purpose, the shaft cleaning device can be designed for discharging gaseous cleaning medium, in particular provided with cleaning granules, and/or have, in particular exclusively, the at least one shaft contact cleaning element for contact cleaning of the treatment element shaft.

A shaft cleaning device in which the cleaning chamber is designed as to be modular and for this purpose has at least two chamber modules which are reversibly connectable to one another along a chamber longitudinal axis of the cleaning chamber can be operated particularly flexibly and economically. Preferably, each of the at least two reversibly interconnectable chamber modules is de-signed as to form at least one, in particular at least two, cleaning portions. Advantageously, this ensures that the cleaning chamber can be flexibly adapted according to the length of the at least one treatment element shaft. Furthermore, different cleaning functions can be combined with each other. Individual chamber modules can be replaced for easy maintenance.

The invention is further based on an object of creating a cleaning system for a screw machine that can be used flexibly for different screw machines and ensures particularly thorough cleaning of the screw machine.

This object is achieved by a cleaning system with a supply device for providing at least one cleaning medium and a housing cleaning device and/or a shaft cleaning device. The advantages of the cleaning system according to the invention correspond to the advantages of the housing cleaning device and the shaft cleaning device already described. Due to the design of the cleaning system with the supply device, the provision of the at least one cleaning medium can be reliably ensured. Interface problems can be reliably prevented.

According to one aspect of the invention, the supply device is configured as to provide at least two cleaning media. Preferably, at least two, in particular at least three, in particular at least four, of the cleaning media differ in terms of composition. Furthermore, the supply device may be configured as to control a pressure and/or a temperature of the at least one cleaning medium. In particular, the supply device can be designed as to provide at least one of the cleaning media described above.

Preferably, the supply device is designed as a circuit supply device. The circuit supply device is characterized in that the at least one cleaning medium is supplied cyclically to the housing cleaning device and/or the shaft cleaning device. Such a supply device can be operated in a particularly economical and environmentally friendly manner.

The supply device can be designed for mechanical and/or chemical and/or biological processing of the cleaning medium. In particular, the supply device for processing the cleaning medium can have a cleaning unit, in particular a filter and/or an oil separator and/or a cleaning element for chemical cleaning. This allows contaminants to be removed from the at least one cleaning medium.

A cleaning system in which the supply device has a contamination sensor for detecting a measured value correlating with a degree of contamination of the at least one cleaning medium can be operated particularly economically. The contamination sensor can be designed, for example, as an optical sensor and/or as a conductivity sensor and/or as a pH value sensor and/or as a viscosity sensor and/or as a pressure sensor and/or as a flow sensor, in particular as a flow velocity sensor. By means of the pH value sensor, it can be detected to what extent the cleaning medium is alkaline or acidic. A supply of cleaning agents containing bases or acids to the cleaning medium can be controlled and/or regulated by means of the supply device, knowing the pH value. Based on viscosity values and/or pressure values and/or flow values of the cleaning medium, the supply device can control and/or regulate a liquid supply and/or the conveyance of the cleaning medium, in particular the operation of a conveyor pump. Furthermore, the supply device can be designed as to compare the measured values determined by means of the contamination sensor with limit values, in order to execute a protective function, in particular a warning function and/or a switch-off function, when the limit values are exceeded. Preferably, the contamination sensor is arranged in an inlet region of the supply device, in which the cleaning medium is uncleaned. The contamination sensor can also be arranged at an outflow of the housing cleaning device and/or the shaft cleaning device. This allows particularly reliable conclusions to be drawn about the contamination state of the screw machine. Alternatively, the contamination sensor can be arranged upstream of the supply device. As a consequence, the contamination level of the cleaning medium can be concluded. The supply device can also have a plurality of contamination sensors. The supply device can be designed as to ensure a replacement of the cleaning medium on the basis of the measured value.

A cleaning system comprising a control device for automated controlling of a cleaning function and/or a cleaning duration ensures a reliable cleaning of the screw machine and can be operated particularly economically. Preferably, the control device is in signal communication with the housing control device and/or with the shaft control device. The cleaning functions may include, for example, certain displacement movements of the support unit and/or of the at least one housing cleaning unit relative to the housing and/or the treatment element shaft relative to the cleaning chamber and/or to the at least one shaft cleaning unit. Further, these may comprise specific sequences for discharging the at least one cleaning medium, in particular under specific pressures and/or temperatures. In particular, the cleaning functions may be designed for discharging different cleaning media, in particular differently combined cleaning media. The cleaning can be terminated depending on the degree of contamination of the cleaning medium, so that an optimum cleaning duration is achieved.

The invention is further based on an object of creating a method for cleaning a screw machine, which is applicable for the flexible cleaning of different screw machines and ensures a particularly reliable and economical cleaning of the screw machine This object is achieved by a method for cleaning a screw machine comprising the steps of providing a screw machine with a housing and at least one treatment element shaft, providing a housing cleaning device and/or a shaft cleaning device, removing the at least one treatment element shaft from the housing, cleaning of the housing and/or the at least one treatment element shaft, wherein the at least one treatment element shaft is arranged outside the housing. The advantages of the method according to the invention correspond to the advantages of the housing cleaning device, the shaft cleaning device and the cleaning system already described.

According to one aspect of the invention, the housing and/or the at least one treatment element shaft may be soaked. For this purpose, the cleaning medium with liquid components is applied to the treatment element shaft and/or to the inner wall of the housing. In particular after a certain exposure time, the cleaning of the housing and/or the at least one treatment element shaft can take place. Advantageously, this ensures that even particularly strongly adhering contaminants can be reliably loosened.

According to one aspect of the invention, the housing and/or the cleaning chamber are heated. Preferably, the heating takes place during soaking and/or cleaning. This may further improve the cleaning result.

The cleaning of the housing and/or the at least one treatment element shaft may be performed by means of the at least one housing cleaning unit and/or the at least one shaft cleaning unit.

A method comprising discharging at least one cleaning medium via the at least one housing cleaning nozzle and/or the at least one shaft cleaning nozzle, determining a measured value correlating with a degree of contamination of the at least one cleaning medium, and controlling the cleaning process in dependence on the measured value ensures a reliable and economical cleaning of the screw machine. Preferably, a duration of the cleaning process is determined as a function of the measured value, in particular a change in the measured value. The cleaning intensity and/or the cleaning effort can thus be controlled as a function of the actual contamination state of the screw machine.

The housing and/or the treatment element shaft can be cleaned completely drily, i.e. without liquid cleaning media.

According to one aspect of the invention, the cleaning of the housing is performed with at least 20%, in particular at least 40%, in particular at least 60%, in particular at least 80%, in particular complete, filling of the housing with the at least one, in particular liquid, cleaning medium.

According to one aspect of the invention, the support unit is displaced solely as a result of the flow of cleaning medium discharged via the at least one housing cleaning nozzle, in particular along the longitudinal axis.

Further features, advantages and details of the invention will be apparent from the following description of several embodiments.

DESCRIPTION OF THE PREFERRED EMBODIMENTS

Figure 1:
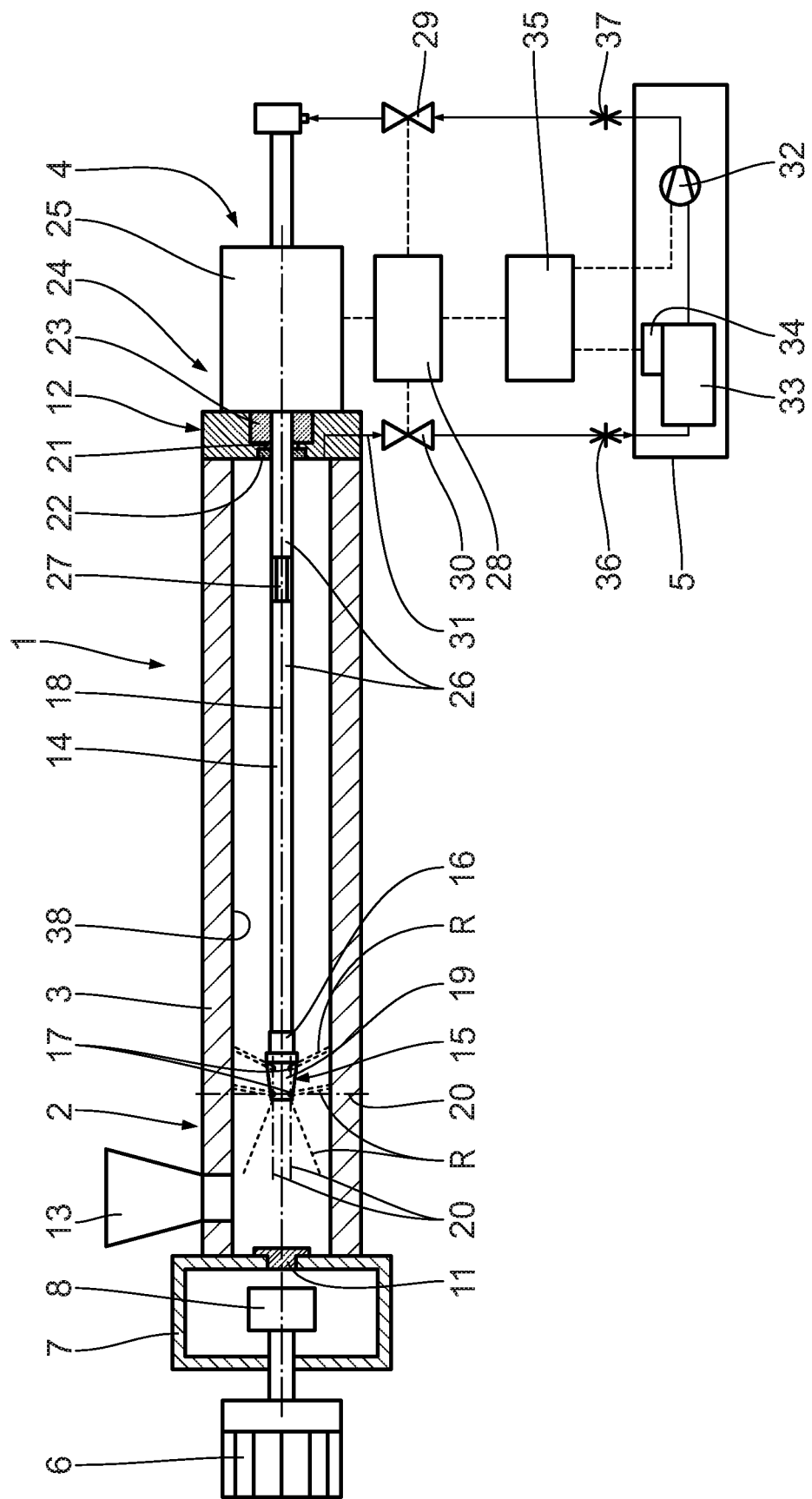
FIG. 1 shows a schematic representation of a cleaning system with a housing cleaning device for cleaning a housing of a screw machine and a supply device, wherein the housing cleaning device has a housing cleaning unit with housing cleaning nozzles.

With reference to FIG. 1, a first embodiment of a cleaning system 1 for a screw machine 2 is described. The cleaning system 1 is designed for cleaning a process part of the screw machine 2, in particular a housing 3 of the screw machine 2. To this end, the cleaning system 1 comprises a housing cleaning device 4 and a supply device 5 for providing a cleaning medium R.

The worm machine 2 has a shaft drive 6. The shaft drive 6 comprises a drive gear. The drive gear of the shaft drive 6 is in communication with a gear lantern 7. The gear lantern 7 comprises a lantern coupling 8 for the reversible, torque-transmitting connection of a drive shaft of the drive gear to a treatment element shaft 9 shown in FIG. 5. The worm machine 2 has a second treatment element shaft, not shown, which can be driven in rotation via a second lantern coupling and a second drive shaft of the drive gear. The treatment element shafts 9 are configured with a shaft coupling portion 10 for the torque-transmitting connection to the drive shafts. For cleaning the worm machine, the treatment element shafts 9 are removed from the housing 3.

The housing 3 is sealed in a fluid-tight manner on the side of the gear lantern 7 by means of a lantern seal 11. A discharge opening of the housing 3 opposite to the gear lantern 7 is sealed by means of a closing unit 12. The housing 3 has a feed hopper 13 for feeding a medium to be conveyed by means of the screw machine 2.

The housing cleaning device 4 has a support unit 14 and a housing cleaning unit 15. The support unit 14 is designed as a rigid support rod. The housing cleaning unit 15 can be reversibly connected to the support unit 14 by means of a support coupling 16. In particular, the housing cleaning unit 15 can be removed from the support unit 14 without tools.

The housing cleaning unit 15 comprises a plurality of housing cleaning nozzles 17 for discharging the cleaning medium R. For supplying the cleaning medium R to the housing cleaning unit 15, the support unit 14 comprises a fluid channel, not shown.

The housing cleaning unit 15 is rotatably mounted to the support unit 14 relative thereto. In particular, the housing cleaning unit 15 is rotatably mounted about a longitudinal axis 18 of the support unit 14. Individual ones of the housing cleaning nozzles 17 are configured such that they are rotatably mounted relative to a housing nozzle base body 19. In particular, these housing cleaning nozzles 17 are rotatably mounted about housing nozzle axes 20.

The closing unit 12 has a support unit feedthrough 21. For fluid-tight closing of the housing 3, the closing unit 12 comprises a feedthrough seal 22, which cooperates with the support unit 14. For guiding the support unit 14, the closing unit 12 comprises a feedthrough bearing 23. The feedthrough bearing 23 is part of a guide unit 24 for axially guiding the support unit 14 in the housing 3. On the side of the housing cleaning unit 15, the guide unit 24 is designed without bearing. The axial guidance of the support unit 14 in the housing 3 is ensured here by discharging the cleaning medium R. As a result, the housing cleaning unit 15 is supported on the housing 3 without contact.

Some of the housing cleaning nozzles 17 have an orientation in the direction of the closing unit 12. This ensures that the cleaning medium R and contaminants are conveyed along the longitudinal axis 18 in the direction of the closing unit 12. The housing cleaning device 4 has a housing drive means 25. The housing drive means 25 is in operative connection with the support unit 14 for translational and rotational displacement relative to the housing 3. In particular, the support unit 14 is displaceable along and rotatable about the longitudinal axis 18 by means of the housing drive means 25. The housing drive means 25 has electric motors, not shown, for this purpose.

The support unit 14 has reversibly interconnectable support modules 26. The support modules 26 are connected to each other by means of a module coupling 27.

The housing cleaning device 4 further comprises a housing control device 28 for automatically controlling the displacement of the support unit 14 relative to the housing 3 and for controlling a mass flow of the cleaning medium R discharged via the housing cleaning nozzles 17. For this purpose, the housing control device 28 is in signal communication with the housing drive means 25. Further, the housing control device 28 is in signal communication with an inflow valve 29 and an outflow valve 30 of the housing cleaning device 4. The inflow valve 29 is in fluid-conducting connection with the support unit 14 and the outflow valve 30 is in fluid-conducting connection with an outflow line 31 of the closing unit 12.

The housing cleaning device 4 is in connection with the supply device 5. The supply device 5 has a pump 32 and a processing device 33. The pump 32 is designed as to pump the cleaning medium R out of the housing 3 and as to provide a conveying pressure for discharging the cleaning medium R via the housing cleaning nozzles 17.

The processing device 33 comprises a filter unit, not shown, for filtering out dirt particles from the cleaning medium R. A contamination sensor 34 is arranged at the processing device 33. The contamination sensor 34 is designed as to detect a measured value correlating with a degree of contamination of the cleaning medium R.

The pump 32 and the contamination sensor 34 are in signal communication with a control device 35 of the cleaning system 1. The control device 35 is designed for automated control of different cleaning functions and of a cleaning duration. For this purpose, the control device 35 is also in signal communication with the housing control device 28. For the connection with the housing cleaning device 4, the supply device 5 has an outflow coupling 36 and an inflow coupling 37.

The mode of operation of the cleaning system 1 or the housing cleaning device 4 for cleaning the housing 3 of the screw machine 2 is as follows:

In conveying operation, the screw machine 2 is supplied with the medium to be conveyed via the feed hopper 13. The treatment element shafts 9 are arranged in the housing 3 and are connected to the shaft drive 6 via the lantern coupling 8 of the gear lantern 7 so that they can be driven in rotation. By rotationally driving the treatment element shafts 9, a medium is conveyed between a feed opening of the housing 3 and the discharge opening. Parts of the medium to be conveyed adhere to and contaminate the housing 3 and the treatment element shafts 9.

To clean the housing 3, a discharge unit, not shown, is removed from the screw machine 2 and the treatment element shafts 9 are taken out of the housing 3.

The housing cleaning unit 15 is arranged at the housing 3. The closing unit 12 is connected to the housing 3 in a sealing manner instead of the discharge unit. The support unit 14 projects through the closing unit 12 and can be displaced relative thereto along the longitudinal axis 18 by means of the feedthrough bearing 23. The housing cleaning unit 15 is attached to the support unit 14 and arranged in the region of the closing unit 12. The gear lantern 7 is closed in a fluid-tight manner by means of the lantern seal 11. The housing cleaning device 4 is connected to the supply device 5 in a fluid-conducting manner via the outflow coupling 36 and the inflow coupling 37.

The cleaning process is started by a control signal from the control device 35. The pump 32 is activated and the cleaning medium R is provided in the form of a cleaning liquid under pressure at the inflow valve 29. In response to a signal from the control device 35, the inflow valve 29 and the outflow valve 30 are opened by means of the housing control device 28. The cleaning medium R reaches the housing cleaning unit 15 via the support unit 14. The cleaning medium R is discharged into the housing 3 via the housing cleaning nozzles 17. Due to the discharged cleaning medium R, the housing cleaning nozzles 17 rotate about the housing rotational axes 20. The cleaning medium R is thus spread particularly evenly over an inner wall 38 of the housing 3.

The outflow of the cleaning medium R via the outflow line 31 is supported by the housing cleaning nozzles 17 oriented in the direction of the closing unit 12. The cleaning medium R discharged in the housing 3 returns to the supply device 5 via the outflow line 31 and the outflow valve 30 as well as the outflow coupling 36.

The control device 35 provides a signal for displacing the support unit 14 relative to the housing 3. By means of the housing control device 28, the housing drive means 25 is activated. A feed motion is transmitted from the housing drive means 25 to the support unit 14. At the same time, a rotational movement about the longitudinal axis 18 is transmitted from the housing drive means 25 to the support unit 14. The housing cleaning unit 15 is displaced in rotation about the longitudinal axis 18 in the direction of the gear lantern 7.

According to a control program stored in the control device 35, different cleaning functions are performed, wherein the housing cleaning unit 15 is alternately displaced along the longitudinal axis, and wherein the pressure provided by the pump 32 for discharging the cleaning medium R via the housing cleaning nozzles 17 is varied.

In the supply device 5, the cleaning medium R is first fed into the processing device 33. In the processing device 33, the dirt particles flushed out of the housing 3 are filtered out. The cleaning medium freed from the dirt particles is sucked in by the pump 32.

By means of the contamination sensor 34, a measured value correlating with the degree of contamination of the cleaning medium R is detected. The measured value is used to determine a contamination state of the housing 3. The cleaning process, in particular a cleaning intensity and duration, is controlled on the basis of the contamination state, in particular of the measured value.

After completion of the cleaning process, the pump 32 is deactivated. The housing cleaning device 4 is removed from the screw machine 2. The treatment element shafts 9 are inserted into the housing 3 and connected to the respective lantern coupling 8. The discharge unit is reattached to the housing 3. The screw machine 2 is ready for recommissioning.

Figure 2:
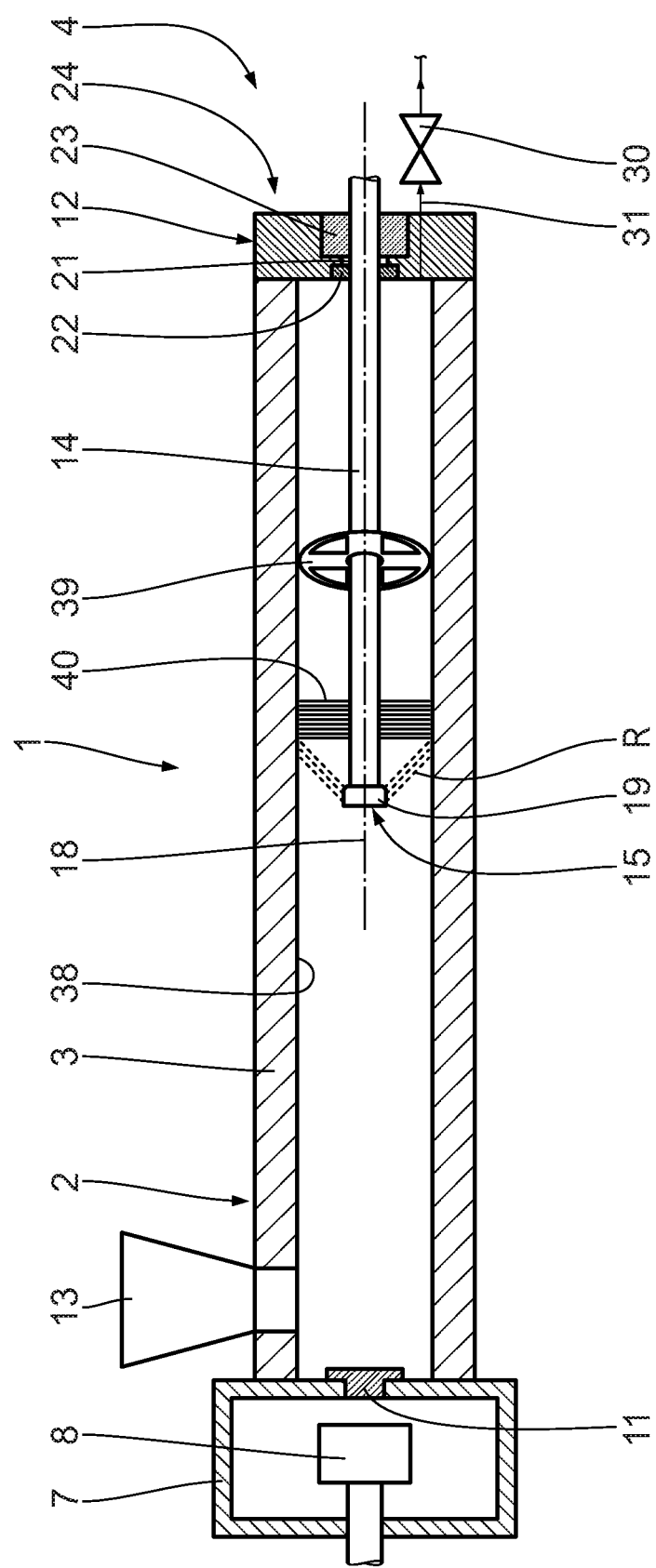
FIG. 2 shows a schematic representation of a cleaning system according to a further embodiment with a housing cleaning device, wherein the housing cleaning device has a housing cleaning unit with a housing contact cleaning element.

With reference to FIG. 2, a further embodiment of the cleaning system 1 or the housing cleaning device 4 is described. In contrast to the previous embodiment, the guide unit comprises a guide body 39 attached to the support unit 14. The guide body 39 is configured in a disc-shaped manner. The support unit 14 penetrates the guide body 39 centrally and is fixedly connected thereto. The guide body 39 is mounted on the inner wall 38 so as to be displaceable along the longitudinal axis 18.

In addition to the housing cleaning nozzles 17, the housing cleaning unit 15 comprises a housing contact cleaning element 40. The housing contact cleaning element 40 is designed as a cleaning brush.

The mode of operation of the cleaning system 1 according to the aforementioned embodiment corresponds to the mode of operation of the cleaning system 1 according to the embodiment described before. When the support unit 14 is displaced along the longitudinal axis 18, the housing cleaning unit 15 is guided along the inner wall 38 by the guide body 39 in a particularly reliable manner. In particular, a spaced guidance of the housing cleaning unit 15 to the inner wall 38 is ensured, whereby damages to the housing 3 and to the housing cleaning unit 15 can be avoided.

The housing contact cleaning element 40 is moved above the inner wall 38 when the support unit 14 is rotated about the longitudinal axis 18. Firmly adhering dirt particles are thereby reliably brushed off the inner wall 38. By means of the housing contact cleaning element 40, recesses of the housing 3 and/or sensor surfaces, in particular of sensors that are arranged in the recesses, can also be reliably cleaned.

Figure 3:
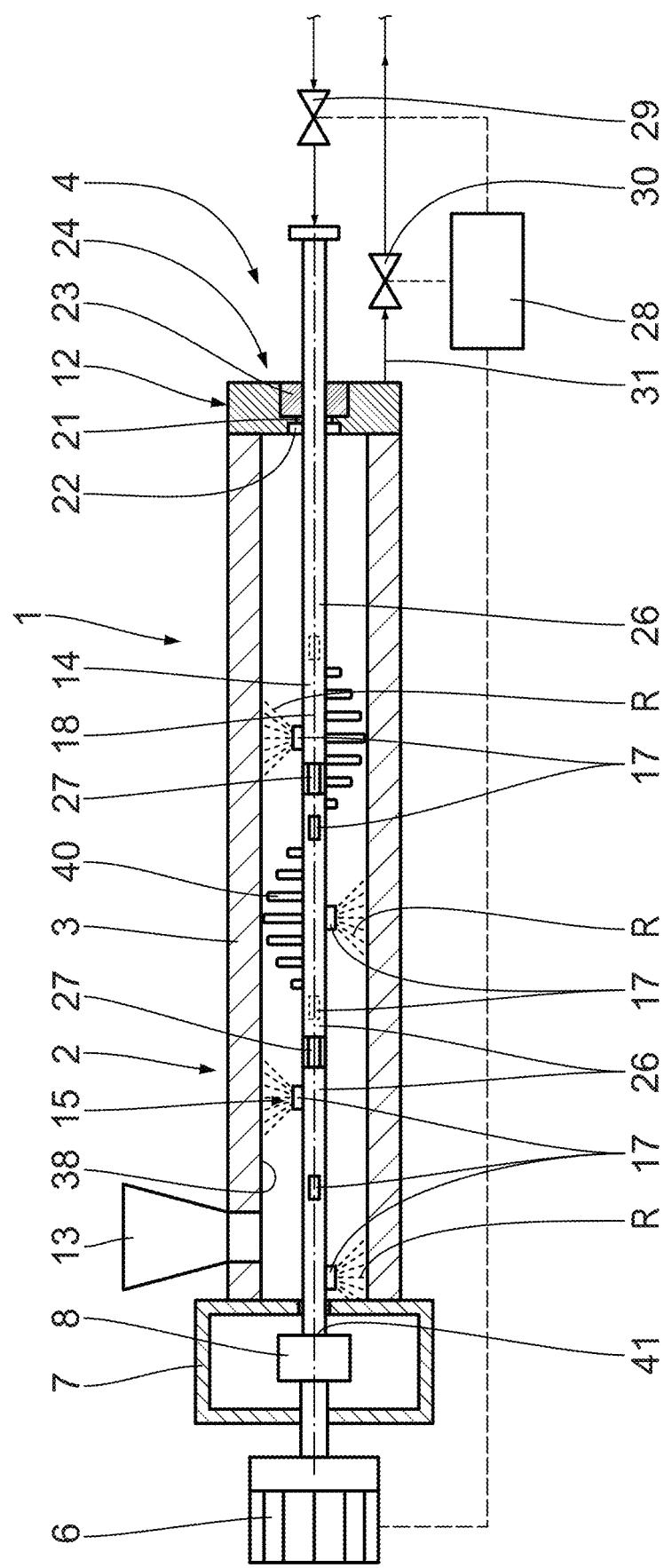
FIG. 3 shows a schematic representation of a cleaning system according to a further embodiment with a housing cleaning device, wherein the housing cleaning device has a support unit with a coupling portion for the connection with a drive means.

With reference to FIG. 3, a further embodiment of the cleaning system 1 or the housing cleaning device 4 is described. In contrast to the previous embodiments, the housing cleaning device 4 does not have a housing drive means 25. The support unit 14 comprises a coupling portion 41 for the connection with the shaft drive 6, in particular with a lantern coupling 8. The support unit 14 comprises three support modules 26, which are connected to each other by means of two module couplings 27. A housing cleaning unit 15 with housing cleaning nozzles 17 is arranged at the support module 26 arranged on the side of the gear lantern 7. The two support modules 26 arranged on the side of the closing unit 12 are each connected with a housing cleaning unit 15 which has both housing cleaning nozzles 17 and housing contact cleaning elements 40.

The housing control device 28, for controlling a rotational movement of the support unit 14 about the longitudinal axis 18 and a mass flow of the cleaning medium R discharged via the housing cleaning nozzles 17, is in signal communication with the shaft drive 6, the inflow valve 29 and the outflow valve 30.

The mode of operation of the cleaning system 1 according to the embodiment described above corresponds to the mode of operation of the cleaning system 1 according to the embodiments described before. In order to assemble the support unit 14, the support modules 26 are connected with each other via the module couplings 27. The housing cleaning device 4 can thus be flexibly configured depending on the state of contamination and a geometry of the housing 3. In particular, the support modules 26 with the respective housing cleaning unit 15 attached thereto are selected according to an extension of the housing 3 along the longitudinal axis 18 and according to an inner diameter of the housing 3.

The housing cleaning device 4 is inserted into the housing 3. The coupling portion 41 is non-rotatably connected with the lantern coupling 8. Via a signal from the control device 35 and the housing control device 28, the support unit 14 is driven in rotation by means of the shaft drive 6. The cleaning medium R provided by the supply device 5 is discharged in the housing 3 via the housing cleaning nozzles 17. The housing contact cleaning elements 40 are moved above the inner wall 38 and clean the latter in contact.

Figure 4:
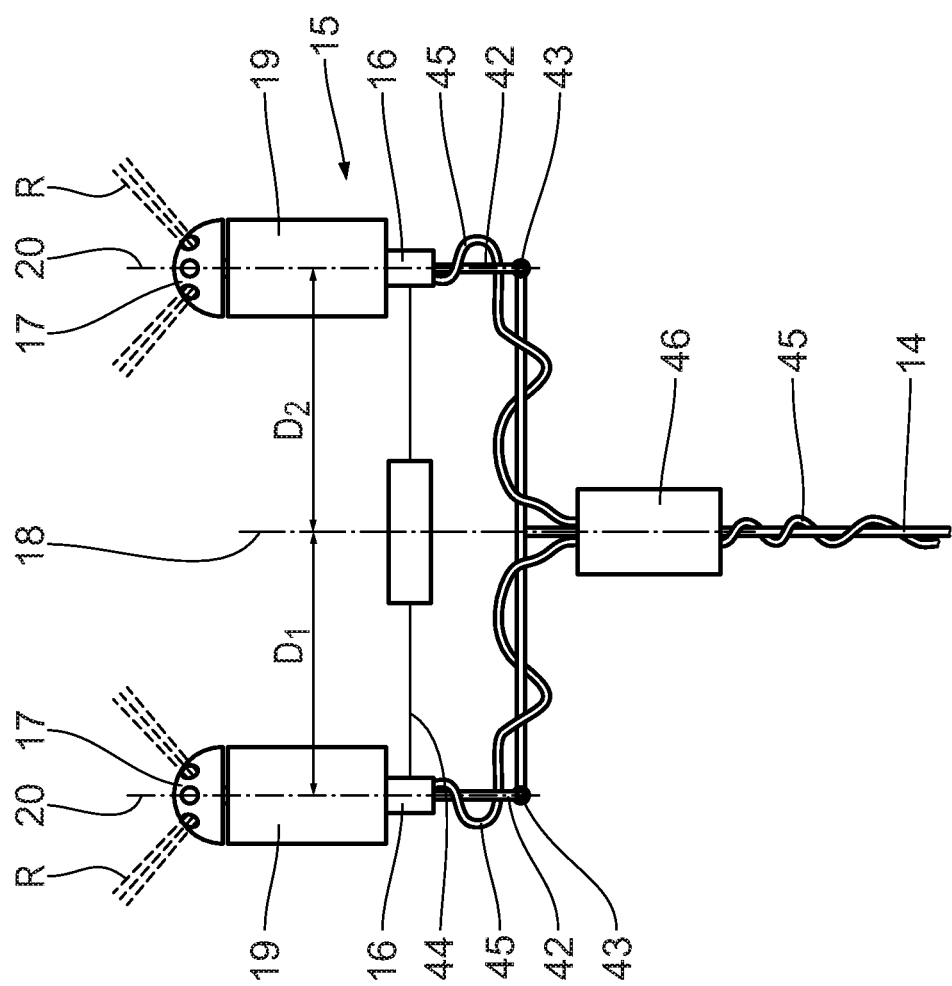
FIG. 4 shows a housing cleaning device according to a further embodiment, wherein the housing cleaning device for cleaning a housing of a multi-shaft screw machine has two housing cleaning units radially spaced apart from a longitudinal axis of the support unit.

With reference to FIG. 4, a further embodiment of the housing cleaning device 4 is described. In contrast to the preceding embodiments, the support unit 14 has two support arms 42 radially spaced from the longitudinal axis 18. The support arms 42 are arranged diametrically opposite to each other at the support unit 14. A plurality of the housing cleaning nozzles 17 are disposed on each of the support arms 42. The housing cleaning nozzles 17 are each rotatably mounted about a housing nozzle axis 20 on a housing nozzle base body 19.

The housing nozzle base bodies 19 are attached to the respective support arm 42 of the support unit 14 by means of one support coupling 16 each. A radial distance $D_1$, $D_2$ between the support couplings 16 and the longitudinal axis 18 can be variably adjusted in each case. For this purpose, the support arms 42 have arm joints 43. The support couplings 16 are connected with each other via a telescopic rod 44. A length of the telescopic rod 44 is variably adjustable and lockable.

The housing cleaning device 4 has tubes 45 for conducting the cleaning medium R along the support unit 14. A distributor 46 is in fluid-conducting connection with the inflow valve 29. The support couplings 16 are connected in a fluid-conducting manner to the distributor 46 by means of the tubes 45.

The mode of operation of the cleaning system 1 with the housing cleaning device 4 according to the aforementioned embodiment corresponds to the mode of operation of the cleaning system 1 according to the embodiment examples described before. Due to the design of the support unit 14 with the two support arms 42 spaced apart from each other, the housing cleaning device 4 is particularly suitable for cleaning multi-shaft screw machines. Preferably, the respective distance $D_1$, $D_2$ is adjusted such that it corresponds to the distance between central longitudinal axes of two housing bores of the housing 3. The two housing bores of the housing 3 can thus be cleaned simultaneously. The support unit 14 can be displaced along the longitudinal axis 18 by means of the housing drive means 25. The rotation of the housing cleaning nozzles 17 about the respective housing rotational axis 20 ensures reliable cleaning of the respective inner wall 38.

Contaminated or defective housing cleaning nozzles 17 can be replaced particularly easily by detaching the respective support coupling 16. In particular, housing cleaning nozzles 17 adapted to the respective region of application can be attached to the support unit 14.

Figure 5:
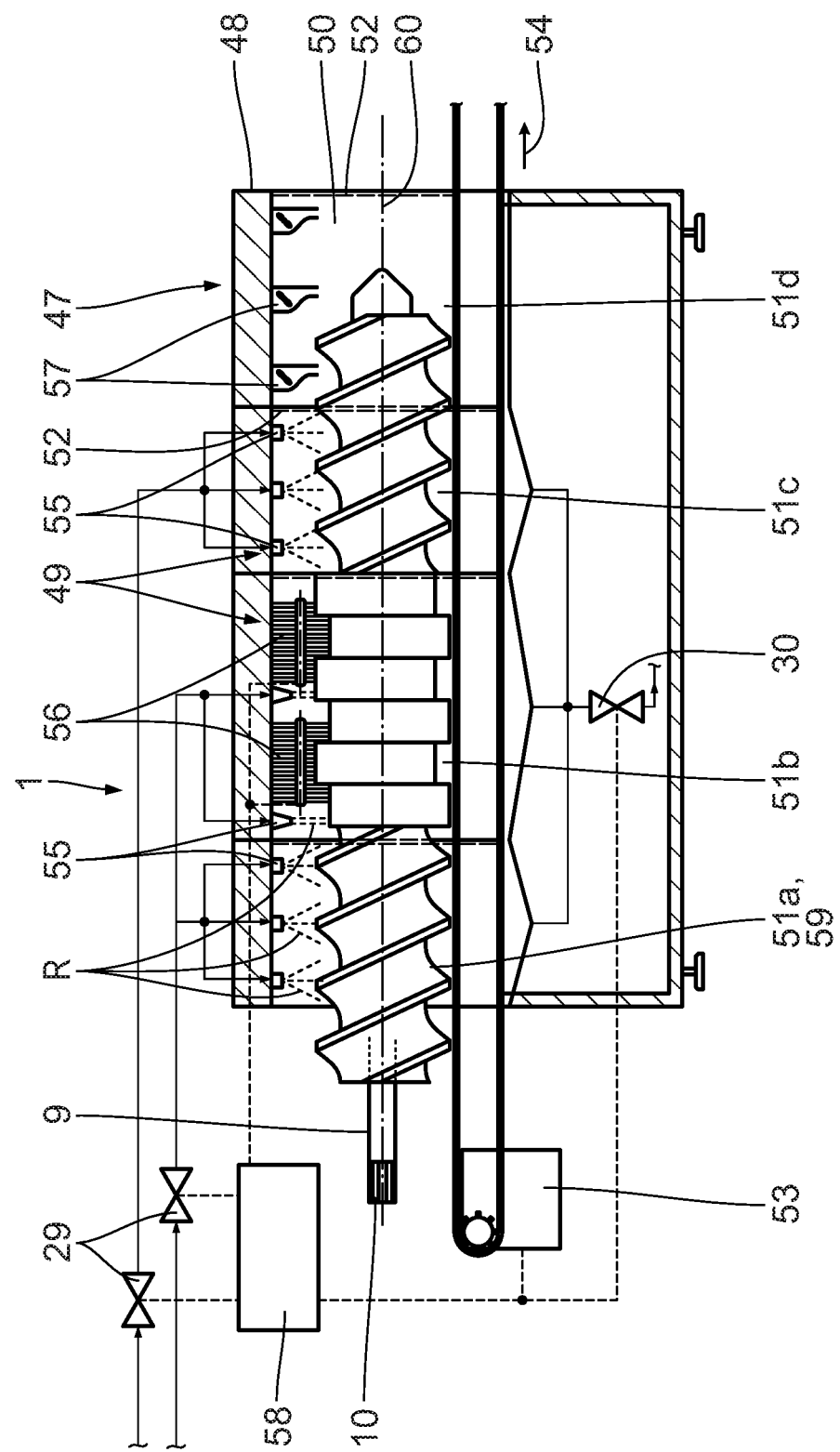
FIG. 5 shows a schematic representation of a shaft cleaning device, wherein the shaft cleaning device is designed for cleaning a treatment element shaft of the screw machine.

With reference to FIG. 5, a further embodiment of the cleaning system 1 is described. In contrast to the previous embodiments, the cleaning system 1 comprises a shaft cleaning device 47 for cleaning the treatment element shafts 9 of the screw machine 2. The shaft cleaning device 47 comprises a cleaning chamber 48 and a plurality of shaft cleaning units 49 arranged in the cleaning chamber 48. An interior space 50 of the cleaning chamber 48 is dimensioned such that the respective treatment element shaft 9 can be guided therethrough. The cleaning chamber 48 has a plurality of cleaning portions 51*a*, 51*b*, 51*c*, 51*d*. The cleaning portions 51*a*, 51*b*, 51*c*, 51*d* are separated from each other by chamber seals 52. The chamber seals 52 ensure that the respective cleaning portion 51*a*, 51*b*, 51*c*, 51*d* is sealed off from splash water to the greatest possible extent.

The shaft cleaning device 47 comprises a shaft drive means 53 for displacing the treatment element shaft 9 relative to the cleaning chamber 48, in particular through the interior space 50. The shaft drive means 53 is designed as a belt conveyor.

The cleaning chamber 48 has the shaft cleaning unit 49 configured with shaft cleaning nozzles 55 in the first cleaning portion 51*a* along a conveying direction 54. In the cleaning portion 51b disposed downstream along the conveying direction 54, a plurality of shaft cleaning units 49 are arranged. These comprise the shaft cleaning nozzles 55 and shaft contact cleaning elements 56. The shaft contact cleaning elements 56 are designed as rotationally driven cleaning brushes, in particular as brush rollers. The shaft cleaning units 49 in the subsequent cleaning portion 51c have the shaft cleaning nozzles 55. In the last cleaning portion 51d, the shaft cleaning units 49 are designed as drying blowers 57 for drying the treatment element shaft 9 displaced through the cleaning chamber 48.

The shaft cleaning unit 49 is in signal communication with a shaft control device 58 for the automated control of the displacement of the treatment element shaft 9 relative to the cleaning chamber 48, for the control of the shaft cleaning units 49 and for the control of a mass flow of the cleaning medium R discharged via the shaft cleaning nozzles 55. The housing control device is in signal communication with the inflow valves 29 for feeding different cleaning media R and with the outflow valve 30 for the outflow of the cleaning medium R loaded with dirt particles.

The shaft cleaning device 47 is connected to a supply device 5 which is not shown. For this purpose, the housing control unit is in signal communication with the control device 35. The inflow valves 29 are in fluid-conducting connection with the inflow couplings 37, and the outflow valve 30 is in fluid-conducting connection with the outflow coupling 36. In contrast to the previous embodiments, the supply device 5 has an additional line for providing clear water. The latter is in fluid-conducting connection with the shaft cleaning nozzles 55 of the third cleaning portion 51c via the additional feed coupling 37.

The subdivision of the cleaning chamber 48 into a plurality of cleaning portions 51a, 51b, 51c, 51d is designed for the spatially separated execution of different cleaning processes. The first cleaning portion 51a is designed as a soaking portion. The second cleaning portion 51b is configured as a jet and contact cleaning portion. The third cleaning portion 51c is designed as a rinsing portion, for rinsing the treatment element shaft 9 with clear water and for removing cleaning media. The fourth cleaning portion 51d is designed for drying the treatment element shaft 9.

The cleaning chamber 48 is configured in a modular manner. For this purpose, the cleaning chamber 48 comprises four reversibly interconnectable chamber modules 59. The chamber modules 59 are connected with each other along a longitudinal chamber axis 60. Due to the modular design, the cleaning chamber 48 can be flexibly adapted to the geometry, in particular a length, of the treatment element shaft 9. Depending on the nature of the treatment element shaft 9, the chamber modules 59 can also be selected according to their cleaning function. For example, the cleaning portions 51a, 51b, 51c, which are designed as wet cleaning portions, can be replaced by pure dry cleaning portions.

The mode of operation of the cleaning system 1 with the shaft cleaning device 47 is as follows:

As described above, the respective treatment element shaft 9 is first removed from the screw machine 2. The treatment element shaft 9 is fed to the shaft drive means 53. The shaft drive means 53 is activated by means of the shaft control device 58. The treatment element shaft 9 is introduced into the interior space 50 of the cleaning chamber 48. The shaft control device 58 provides a signal to open the inflow valves 29 and the outflow valve 30, and the cleaning medium R is discharged in the interior 50 via the shaft cleaning nozzles 55. The shaft control device 58 provides a signal for activating a rotary drive of the shaft contact cleaning elements 56.

The treatment element shaft 9 is displaced along the chamber longitudinal axis 60 through the cleaning chamber 48. In the first cleaning portion 51a, the treatment element shaft 9 is applied with the cleaning medium R for soaking contaminants. In the second cleaning portion 51b, the treatment element shaft 9 is cleaned by means of the shaft contact cleaning elements 56, which are designed as a rotating cleaning brushes, and by means of the shaft cleaning nozzles 55. In the third cleaning portion 51c, the cleaning medium R is purified by clear water discharged via the shaft cleaning nozzles 55. In the fourth cleaning portion 51d, the treatment element shaft 9 is dried by means of the drying blower 57. The treatment element shaft 9 conveyed out of the cleaning chamber 48 is cleaned and dried.

According to the mode of operation of the supply device 5 and the control device 35, described above, the cleaning process, in particular a cleaning intensity and duration, can be controlled corresponding to the contamination state of the treatment element shaft 9.

The cleaning system 1 with the housing cleaning device 4 or the shaft cleaning device 47 ensures a particularly efficient and reliable cleaning of the housing 3 or the respective treatment element shaft 9 of the screw machine 2. The design of the cleaning system 1 with the supply device 5 allows for an environmentally friendly and resource-saving cleaning of the housing 3 and the treatment element shaft 9.

What is claimed is:

1. A housing cleaning device for cleaning a housing of a screw machine, having
    a support unit displaceable relative to the housing, and
    at least one housing cleaning unit attached to the support unit for cleaning an inner wall of the housing,
    wherein the at least one housing cleaning unit is reversibly insertable into the housing,
    wherein the support unit has a coupling portion configured to be connected with a shaft drive of the screw machine,
    wherein the support unit is designed as to be modular, and for this purpose has at least two support modules which are reversibly connectable with one another along a longitudinal axis of the support unit.

2. The housing cleaning device according to claim 1, wherein the at least one housing cleaning unit has at least one housing cleaning nozzle for discharging at least one cleaning medium.

3. The housing cleaning device according to claim 1, wherein the at least one housing cleaning unit has at least one housing contact cleaning element, connected with the support unit, for contact cleaning of the housing.

4. The housing cleaning device according to claim 1, wherein the support unit is designed as to be rotatably mounted relative to the housing.

5. The housing cleaning device according to claim 1, comprising at least one support coupling for reversibly connecting the at least one housing cleaning unit with the support unit.

6. The housing cleaning device according to claim 1, comprising a guide unit for axially guiding the support unit on the housing.

7. The housing cleaning device according to claim 1, wherein the support unit has an adjustment element which is designed such that the at least one housing cleaning unit is arrangeable at the support unit, at an adjustable distance transversely to a longitudinal axis of the support unit.

8. The housing cleaning device according to claim 1, wherein the at least one housing cleaning unit is designed as to convey contaminants along a longitudinal axis of the support unit.

9. The housing cleaning device according to claim 1, comprising a housing control device for automated controlling of at least one of a displacement of the support unit relative to the housing and of a mass flow of at least one cleaning medium introduced into the housing.

10. The housing cleaning device according to claim 1, wherein the coupling portion is configured to drive the support unit in rotation by means of the shaft drive.

11. A cleaning system with
a supply device for providing at least one cleaning medium and
a housing cleaning device according to claim 1.

12. The cleaning system according to claim 11, wherein the supply device has a contamination sensor for detecting a measured value correlating with a degree of contamination of the at least one cleaning medium.

13. The cleaning system according to claim 11, comprising a control device for automated controlling of at least one of a cleaning function and a cleaning duration.

14. A method for cleaning a screw machine comprising the steps of:
providing a screw machine with a housing and at least one treatment element shaft,
providing a housing cleaning device according to claim 1,
removing the at least one treatment element shaft from the housing,
cleaning of the housing, wherein the at least one treatment element shaft is arranged outside the housing.

15. The method according to claim 14, comprising discharging at least one cleaning medium via at least one housing cleaning nozzle of the housing cleaning device.

16. The method according to claim 14, comprising determining a measured value correlating with a degree of contamination of the at least one cleaning medium.

17. The method according to claim 16, comprising controlling the cleaning process in dependence on the measured value.

18. A housing cleaning device for cleaning a housing of a screw machine, having
a support unit displaceable relative to the housing, and
at least one housing cleaning unit attached to the support unit for cleaning an inner wall of the housing,
wherein the at least one housing cleaning unit is reversibly insertable into the housing,
wherein the support unit has a coupling portion configured to be connected with a shaft drive of the screw machine,
wherein the at least one housing cleaning unit has at least one housing cleaning nozzle for discharging at least one cleaning medium, and
wherein the at least one housing cleaning nozzle is rotatably mounted relative to the support unit.

* * * * *